United States Patent [19]
Uchida et al.

[11] Patent Number: 5,383,075
[45] Date of Patent: Jan. 17, 1995

[54] SLIDER BODY WITH EMBEDDED LUBRICANTS AND MAGNETIC BIASING APPARATUS

[75] Inventors: Kiyoshi Uchida, Yamatotakada; Norio Miyataka, Kobe, both of Japan

[73] Assignee: Matsushita Electric Industrial Co., Ltd., Osaka, Japan

[21] Appl. No.: 83,924

[22] Filed: Jun. 28, 1993

[30] Foreign Application Priority Data

Jun. 29, 1992 [JP] Japan .................................. 4-170412
Jun. 29, 1992 [JP] Japan .................................. 4-170413

[51] Int. Cl.$^6$ .......................... G11B 5/187; G11B 5/02
[52] U.S. Cl. ............................................ 360/122; 360/59
[58] Field of Search ................ 360/103, 104, 122, 59; 369/13

[56] References Cited

U.S. PATENT DOCUMENTS 4,701,894 10/1987 Watson ................................. 369/13
5,211,734  5/1993 Yagami et al. ................... 360/122 X
5,231,613  7/1993 Nakayama et al. .............. 360/114 X

FOREIGN PATENT DOCUMENTS 63-58605  3/1988 Japan .
63-229643 9/1988 Japan .

OTHER PUBLICATIONS

Gotou, Atsushi, "Contact Type Head", JP 60-028086, Jun. 26, 1985.

Primary Examiner—Donald Hajec
Assistant Examiner—T. N. Forbus, Jr.
Attorney, Agent, or Firm—Ratner & Prestia

[57] ABSTRACT

A magneto-optical disk driving apparatus of the magnetic field modulated recording type is generally provided with a magnetic biasing apparatus, which generates a magnetic field required to record or erase information signals on or from a magneto-optic recording medium. The magnetic biasing apparatus includes a magnetic circuit capable of recording or erasing the information signals on or from the magneto-optical recording medium and a slide member bonded to an open end of the magnetic circuit. The slide member is made up of a crosslinked setting resin, one or two lubricants contained in the setting resin, and a filler embedded in the setting resin. One of the lubricants has a linear molecular structure, whereas the other has a branched molecular structure. The filler is made up of a large number of porous particulates having a specific surface of from 100 to 1000 $m^2/g$ (measured in accordance with the BET equation) and a large number of whiskers having a diameter in the order of submicrons or less.

6 Claims, 3 Drawing Sheets

SLIDER BODY WITH EMBEDDED LUBRICANTS AND MAGNETIC BIASING APPARATUS

BACKGROUND OF THE INVENTION

1. Field of the Invention

The present invention relates to a magnetic biasing apparatus for generating a magnetic field required to record or erase information signals on or from a magneto-optic recording medium.

2. Description of the Prior Art

In recent years, a magneto-optical disk has come to be recognized as a sophisticated high-density recording medium and has rapidly been popularized on the market. In addition, there is growing interest in a magnetic field modulated magneto-optical recording method whereby immediate writing (overwriting) is possible. In this method, information recording is performed primarily by modulating a magnetic field, and a magnetic biasing apparatus plays a very important role in magnetic field modulation.

The magnetic field modulation for the magneto-optical disk is discussed in detail hereinafter.

The magneto-optical disk comprises a transparent disk substrate having a number of generally concentric pre-grooves defined therein, a plurality of thin films laminated one upon another on one surface of the substrate, and a protective coating overlying the thin films. The thin films are generally a protective film, a recording film, and a reflection film.

In recording information on the magneto-optical disk, the magneto-optical disk is rotated about the center thereof, and a laser beam throttled by an objective lens is applied thereto from the substrate side and is focused on a desired portion of the pre-grooves by the use of a focusing control means. Thereafter, such desired portion is scanned along the pre-grooves by a tracking control means.

In reading the information recorded on the magneto-optical disk, a magneto-optical effect is utilized. More specifically, when a polarized laser beam is applied to the recording film of the magneto-optical disk, reflected light thereof causes a rotation of a polarized light plane in compliance with the direction of magnetization of the recording film. The angle of rotation of this polarized light plane is then converted into an electric signal by the use of an optical element, for example a polarizer, a photodetector, and the like in order to read the information.

The recording utilizes a non-modulated laser beam and a modulated magnetic field. The modulated magnetic field is generated by a magnetic biasing apparatus having a magnetic head placed on the side of the protective coating of the magneto-optical disk. The magnetic head comprises a core made of a high-permeability material and a coil wound therearound, and generates a modulated magnetic field by controlling an electric current which is allowed to flow in the coil.

Because the magneto-optical disk to which the laser beam has been applied is partially heated, the power of the laser beam is controlled so that the temperature of the recording film at that portion of the magneto-optical disk to which the laser beam has been applied (this portion is hereinafter referred to as a recording spot) may become a temperature in the neighborhood of the Curie point of a magnetic film constituting the recording film. The magnetic film has a perpendicular magnetic anisotropy and loses magnetization at temperatures over the Curie point. When the temperature of the magnetic film is reduced below the Curie point, the magnetization appears, and the direction thereof depends upon the direction of the magnetic field applied from outside. By making use of this property, the recording is generally performed by controlling the direction of magnetization of the magnetic film.

In the recording film of magneto-optical disks currently in use, the magnitude of the magnetic field which must be applied from outside during recording is in the range of $\pm 100$ to $\pm 400$ Oe. In order to apply this magnitude of the magnetic field to the recording spot at a modulated frequency over several hundreds kHz, the inductance of the magnetic head is required to be below several $\mu H$. To this end, it is necessary to reduce the size of the core of the magnetic head and to make the distance between an open end of a magnetic circuit of the magnetic head and the recording spot of the recording film as small as possible.

In order to bring the open end of the magnetic circuit of the magnetic biasing apparatus near the recording spot on the magneto-optical disk, a sliding method is disclosed in, for example, Japanese Laid-open Patent Publication No. 63-58605, and a floating method is disclosed in, for example, Japanese Laid-open Patent Publication No. 63-229643.

The sliding method is a method wherein the open end of the magnetic circuit of the magnetic head is opposed to the protective coating of the magneto-optical disk while the slide member mounted on the former is in direct contact with the latter.

The floating method is a method wherein the protective coating of the magneto-optical disk is opposed to and spaced away from the open end of the magnetic circuit of the magnetic head with a very small empty space defined therebetween. The floating method includes two types, in one of which the magnetic head is integrally formed with or otherwise secured to a generally flat floating member, and air is introduced between the protective coating and the floating member by making use of the relative speed between the floating member and the protective coating of the magneto-optical disk, thereby maintaining the empty space. In the other type of floating method, the empty space is maintained very small by a servo system which comprises a position detection means, a position control means, and the like.

The sliding method includes a problem in connection with sliding durability. More specifically, the problem is encountered as to which material should be chosen as the material interposed between the protective coating and the magnetic head. According to the Japanese Laid-open Patent Publication No. 63-58605, the slide member is coated with, for example, a synthetic resin or covered with a thin film. Alternatively, the slide member is made of fluorocarbon resin, boron nitride, graphite, or a composite material based on these materials. Furthermore, this publication teaches that the slide member may contain a lubricant such as, for example, a fatty acid, a higher alcohol, a fatty acid ester or the like.

Based on the contents of this publication, inventors of the instant application prepared a slide member and incorporated it into a magnetic head of a magnetic biasing apparatus. Using this magnetic biasing apparatus, information recording was performed on a magneto-optical disk while a sliding condition is maintained for a long time. As a result, it was discovered that read signals were deteriorated in quality.

The inventors investigated causes of such deterioration in detail and have discovered that shortage of a recording magnetic field or a variation in the interval between recording pits deteriorated the signal quality. The shortage of the recording magnetic field was mainly caused by the fact that the sliding operation brought about a flow and deformation of the surface of the slide member, and the recording film of the magneto-optical disk was moved slightly away from the open end of the magnetic circuit of the magnetic head. As a result, a predetermined magnitude of external magnetic field was not applied to the recording film. The variation in the interval between the recording pits was mainly caused by the fact that the sliding operation brought about abrasion of the surface of the slide member and changed the surface state. Because of this, the friction force varied according to the position on the protective coating, which in turn caused a variation in speed of the magneto-optical disk. As a result, the variation in the interval between the recording pits occurred.

In the air-floating method, if the relative speed between the protective coating and the floating member is reduced, the floating stability is lost, and the distance between the magnetic head and the recording film varies. This causes a variation in magnitude of the applied magnetic field and deteriorates the quality of the recording signals.

In the servo-floating method, the position detection means and the position control means require relatively expensive parts, and each of them has a complicated structure and requires a relatively large installation space. Such means does not meet requirements of users towards an inexpensive and thin-structured apparatus.

SUMMARY OF THE INVENTION

The present invention has been developed to overcome the above-described disadvantages.

It is accordingly an object of the present invention to provide a magnetic biasing apparatus which causes no deterioration in information quality even after recording operations have been repeatedly performed for a long time.

Another object of the present invention is to provide a magnetic biasing apparatus of the above-described type which has a simple structure and can be readily manufactured at a low cost.

In accomplishing the above and other objects, the following properties must be imparted to a sliding surface of a slide member of the magnetic biasing apparatus.

(A) Lubricating properties of the slide member depend upon a lubricant contained or occluded therein. Accordingly, the slide member is required to have a specific structure whereby an approximate amount of lubricant is held on the surface thereof for a long time.

(B) Deformation of the sliding surface of the slide member which has hitherto been caused by sliding operations is not preferred in maintaining the sliding stability. Accordingly, the deformation of the sliding surface must be prevented by enhancing resistance of the slide member to abrasion.

(C) The magnetic biasing apparatus according to the present invention is suited for use in recording or reading information on or from an magneto-optical disk, and the slide member thereof slides relative to a protective coating of the magneto-optical disk. Because the protective coating is formed of a resin, the slide member is required to have a specific structure which causes neither abrasion nor deformation of the mating material (resin).

To satisfy the above-mentioned requirements, the magnetic biasing apparatus according to the present invention comprises a magnetic circuit having an open end and a slide member bonded to the open end of the magnetic circuit. The magnetic circuit can record or erase information signals on or from a magneto-optical recording medium and comprises a magnetic member having a high permeability and a winding wound around the magnetic member, both of which are disposed on the open end of the magnetic circuit. The slide member comprises a crosslinked setting resin, a first lubricant contained in the setting resin, and a filler embedded in the setting resin.

In the magnetic biasing apparatus according to the present invention, a fatty acid or a fatty acid ester containing long chain hydrocarbon, a fluorocarbon, a silicon derivative, a fatty acid chloride, a fatty acid amide or the like is used solely or in combination as the lubricant contained in the slide member. The use of such materials brings about desired lubricating effects at the beginning of the sliding operation. However, in order to appropriately maintain the sliding operation for a long time, an appropriate supply of the lubricant onto the surface of the slide member is required.

To this end, according to the present invention, an appropriate supply of the lubricant from the inside of the slide member onto the sliding surface of the slide member is maintained for a long time by a specific molecular structure of the lubricant. The lubricant has a linear molecular structure, and preferably, has both a linear molecular structure and a branched molecular structure in order to pass through constituent molecules of the slide member at an appropriate speed.

Furthermore, the filler is required to have two functions. One of them is to prevent deformation of the sliding surface of the slide member during the sliding operation. This function can be achieved by rendering the filler to have a fibrous tissue. Coupling fibers with the molecules of the slide member prevents the resin constituting the slide member from flowing in a direction of slide thereof. The use of fibers having a high hardness enhances the apparent hardness of the slide member, thereby providing resistance to abrasion. Although glass fibers, carbon fibers or the like can be used as the filler, if the diameter thereof exceeds several $\mu$m, it is likely that the slide member would damage the protective coating of the magneto-optical disk. Because of this, whiskers having a diameter in the order of submicrons are preferred as the filler. The effects of the present invention can be sufficiently obtained by the use of potassium titanate, zinc oxide, TiN, or SiC whiskers having a diameter in the range of 0.1–1 $\mu$m and a length in the range of 5–30 $\mu$m, and preferably, the diameter ranges from 0.3 $\mu$m to 0.6 $\mu$m and the length ranges from 10 $\mu$m to 20 $\mu$m.

Another function of the filler is to increase the amount of the lubricant to be occluded in the slide member. Although the slide member is essentially composed of a crosslinked setting resin, mixing the lubricant into the crosslinked setting resin renders the lubricant to enter and remain in spaces between crosslinked molecules. Because the size of the spaces between the molecules depends upon the crosslink density of the crosslinked setting resin, the amount of the lubricant to be occluded in the slide member can be increased by reducing the crosslink density to thereby increase the spaces. The reduced crosslink density, however, occasionally reduces the mechanical strength of the crosslinked setting resin or loses the thermal stability thereof. Accordingly, the crosslink density cannot be reduced by increasing the amount of the lubricant which the slide member can occlude.

In the magnetic biasing apparatus according to the present invention, the filler is embedded in the slide member to increase the amount of the lubricant contained in the slide member. Molecules of the crosslinked setting resin are not crosslinked with those of the filler, and therefore, gaps tend to be produced in interfaces defined therebetween. The amount of occluded lubricant is increased by holding the lubricant in such gaps. Accordingly, a porous filler having a relatively wide surface area is used as the filler embedded in the slide member of the magnetic biasing apparatus.

Furthermore, the crosslinked setting resin functions to enhance the sliding durability against temperature changes. The lubricant exhibits a high fluidity at high temperatures and a low fluidity at low temperatures. Accordingly, the lubricant occluded in the slide member can easily move at high temperatures. On the other hand, in the thermosetting resin, an increase in temperature reduces the spaces between the molecules and prevents the lubricant from being excessively supplied onto the surface of the slide member, thereby preventing an excessive consumption of the lubricant and maintaining an appropriate supply of the lubricant onto the surface of the slide member. The excessive supply of the lubricant may cause an adverse effect such as, for example, an increase in friction force which can be prevented by the present invention.

As discussed hereinabove, the present invention can realize a slide member having a good sliding durability, and provides a magnetic biasing apparatus capable of applying a stable magnetic field by the sole use of a lubricant having a linear molecular structure or the use thereof in combination with a lubricant having a branched molecular structure, and by the use of a filler comprised of whiskers and a porous material, and a crosslinked setting resin.

BRIEF DESCRIPTION OF THE DRAWINGS

The above and other objects and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

Figure 1:
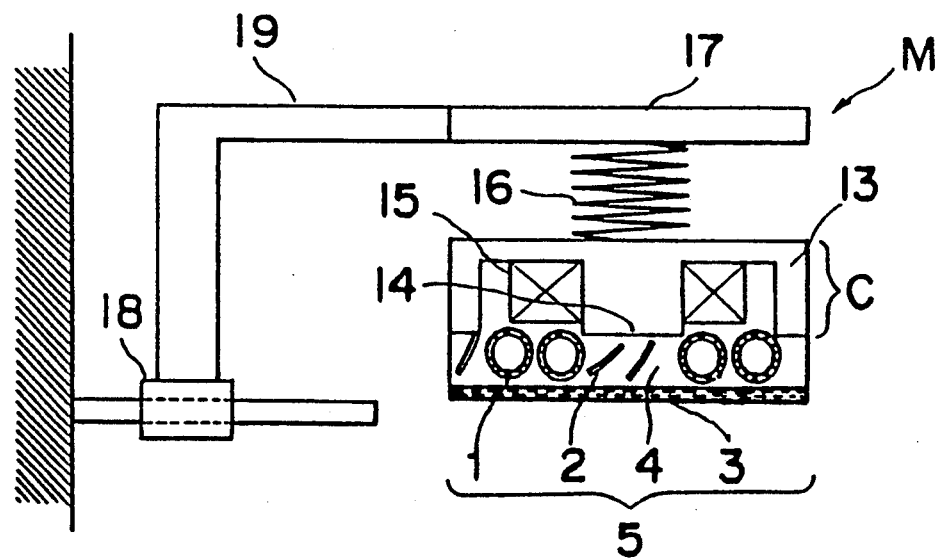
FIG. 1 is a schematic vertical view of a magnetic biasing apparatus, partly in section, according to a first embodiment of the present invention.

Referring now to the drawings, there is schematically shown in FIG. 1 a magnetic biasing apparatus M according to a first embodiment of the present invention. The magnetic biasing apparatus M comprises a slide member 5 and a magnetic circuit C having an open end to which the slide member 5 is bonded. The slide member 5 comprises an epoxy resin layer 4, a large number of silica particulates 1 and a large number of potassium titanate whiskers 2 both embedded in the epoxy resin layer 4, and a lubricant 3 contained or occluded in the epoxy resin layer 4. The silica particulates 1 have a specific surface in the range of 100–1000 $m^2/g$, which was measured in accordance with the BET (Brunauer-Emmett-Teller) adsorption isotherm equation. The potassium titanate whiskers 2 have a diameter in the range of 0.3–0.6 $\mu m$ and a length in the range of 10–20 $\mu m$. The lubricant 3 is based on a fatty acid ester having a linear molecular structure and gradually oozes out of the epoxy resin layer 4 to form an extremely thin lubricant layer on the surface thereof, as shown in FIG. 1. The magnetic circuit C comprises a yoke portion 13 made of ferrite and bonded to the slide member 5, a main magnetic pole 14 made of ferrite and bonded to the slide member 5, and a winding 15 wound around the main magnetic pole 14. The yoke portion 13 is connected to one end of a spring 16, the other end of which is connected to a base 17. The base 17 is connected to a movable element 18 via a generally L-shaped pillar 19.

It is to be noted that in this embodiment, although the silica particulates 1 are employed as a filler, any other suitable porous particulates may be employed as the filler in place thereof.

It is also to be noted that the material of the yoke portion 13 and that of the main magnetic pole 14 are not limited by ferrite, and any other suitable magnetic material having a high permeability may be employed.

Figure 2:
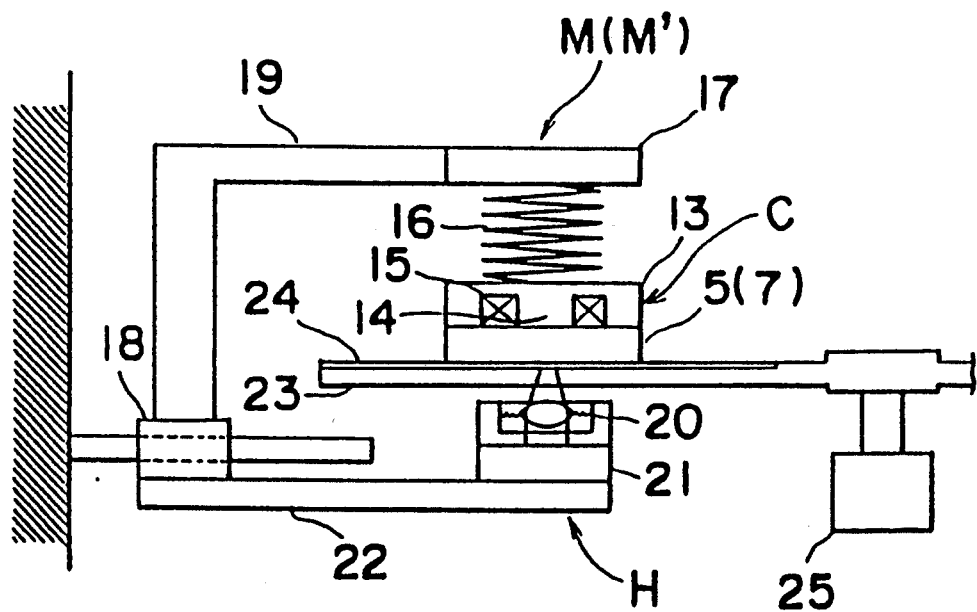
FIG. 2 is a schematic vertical view of the magnetic biasing apparatus when used to record information on a magneto-optical disk.

The magnetic biasing apparatus M of the above-described construction is generally coupled with an optical head assembly H, as shown in FIG. 2. The optical head assembly H generally comprises an optical head 21 with an objective lens 20 and a head carrier 22 through which the optical head 21 is connected to the movable element 18 of the magnetic biasing apparatus M.

In recording information on an magneto-optical disk 23, the magneto-optical disk 23 is initially coupled with a spindle motor 25 and is subsequently placed between the slide member 5 of the magnetic biasing apparatus M and the optical head 21.

When the magneto-optical disk 23 is rotated by the spindle motor 25, a protective coating 24 overlying the magneto-optical disk 23 is brought into contact with the slide member 5 and slides relative thereto. When the speed of the magneto-optical disk 23 reaches a specific one and when that portion of the magneto-optical disk 23 on which recording is to be performed (this portion is hereinafter referred to as a recording spot) is positioned between the slide member 5 and the optical head 21 by the operation of the movable element 18, a laser beam focused on the magneto-optical disk 23 is applied to a magneto-optical recording film formed on the magneto-optical disk 23 for the heating of the recording spot while the position of the objective lens 20 is being controlled by a tracking control means and a focusing control means. At the same time, the information is written to the magneto-optical recording film by allowing a modulated current corresponding to a recording signal to flow in the winding 15 of the magnetic biasing apparatus M. In reading, no current is allowed to flow in the winding 15, and a laser beam having a power less than that of the laser beam used during recording is applied to the recording spot while the position of the objective lens 20 is being controlled by the tracking control means and the focusing control means. In short, the so-called magneto-optic Kerr effect is utilized during reading.

Figure 3:
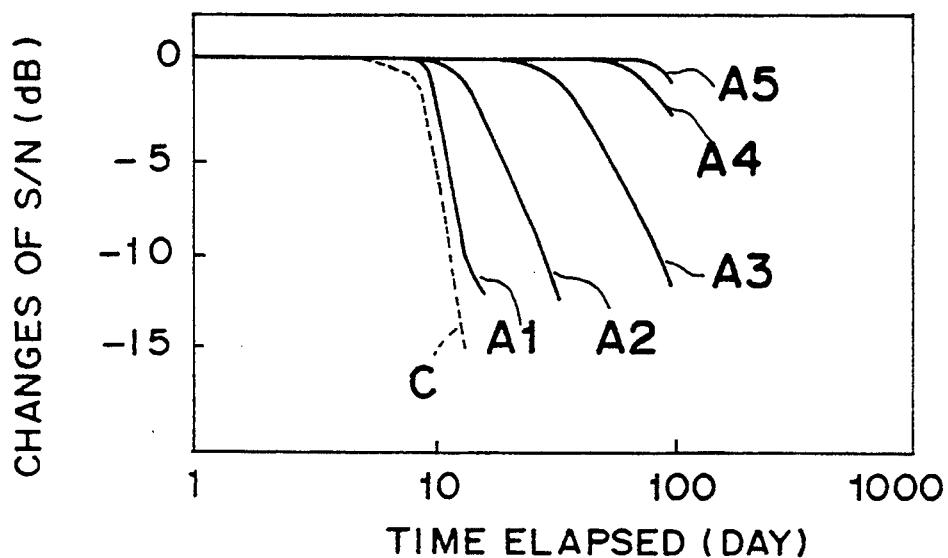
FIG. 3 is a graph indicating changes in S/N ratio with time at the time recording and reading have been repeated using the magnetic biasing apparatus of FIG. 1 while the specific surface of a filler is changed.

FIG. 3 is a graph indicating changes in reproduced signal-to-noise ratio (S/N ratio) with time at the time recording and reading have been repeated at a relative speed of 1.2 m/sec between the magnetic biasing apparatus M and the magneto-optical disk 23 under an environment having a temperature of 60° C. and a relative humidity of 80%. In the graph of FIG. 3, curves shown by A1 through A5 represent changes in S/N ratio in applications where several magnetic biasing apparatus M according to the present invention have been used, whereas a curve shown by C is plotted for comparison and represents a change in S/N ratio in applications where recording and reading have been repeated by the use of a conventional magnetic biasing apparatus.

The curves A1 through A5 have been drawn by changing the specific surface (measured in accordance with the BET equation) of the silica particulates 1 (5% by weight relative to the epoxy resin layer 4 in the slide member 5). Table 1 indicates the specific surface (measured in accordance with the BET equation) of the silica particulates 1 contained in the slide member 5 of each magnetic biasing apparatus M.

TABLE 1

|  | No. of Slide Member | | | | |
| --- | --- | --- | --- | --- | --- |
|  | A1 | A2 | A3 | A4 | A5 |
| Specific Surface (m²/g) | 10 | 50 | 100 | 300 | 1000 |

As is clear from the graph of FIG. 3, if the specific surface (by BET) of the silica particulates 1 contained in the slide member 5 is greater than 100 m²/g, a deterioration in signal quality due to deterioration of the sliding characteristic, which has hitherto been caused in the conventional apparatus, has not been confirmed in the magnetic biasing apparatus M according to the present invention.

Figure 4:
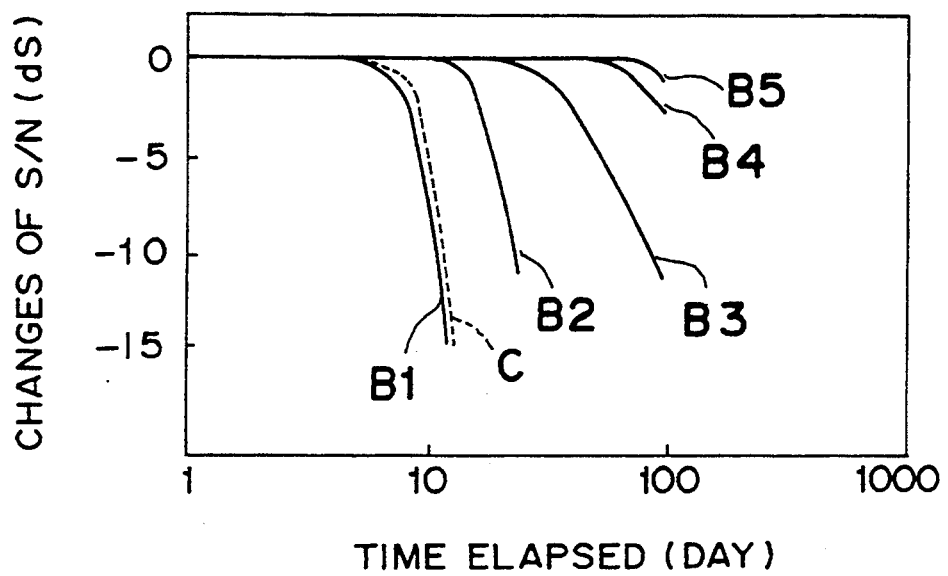
FIG. 4 is a graph similar to FIG. 3, but obtained by changing the mixing ratio of the filler relative to a slide member.

FIG. 4 is a graph indicating changes in S/N ratio with time at the time recording and reading have been repeated at a relative speed of 1.2 m/sec between the magnetic biasing apparatus M and the magneto-optical disk 23 under an environment having a temperature of 60° C. and a relative humidity of 80%. In the graph of FIG. 4, curves shown by B1 through B5 represent changes in S/N ratio in applications where several magnetic biasing apparatus M according to the present invention have been used, whereas a curve shown by C is plotted for comparison and represents a change in S/N ratio in applications where recording and reading have been repeated by the use of the conventional apparatus.

The curves B1 through B5 have been drawn by changing the mixing ratio of the silica particulates 1 (specific surface: 100 m²/g) with respect to the slide member 5. Table 2 indicates the weight ratio of the silica particulates 1 relative to the epoxy resin layer 4 in the slide member 5 of each magnetic biasing apparatus M.

TABLE 2

|  | No. of Slide Member | | | | |
| --- | --- | --- | --- | --- | --- |
|  | B1 | B2 | B3 | B4 | B5 |
| Weight Ratio (%) | 0 | 1 | 5 | 8 | 15 |

As is clear from the graph of FIG. 4, if the weight ratio of the silica particulates 1 relative to the epoxy resin layer 4 in the slide member 5 is greater than 1%, a deterioration in signal quality due to deterioration of the sliding characteristic, which has hitherto been caused in the conventional apparatus, has not been confirmed in the magnetic biasing apparatus M according to the present invention.

It is considered that the sliding characteristic has been improved, as shown in FIGS. 3 and 4, for the following reasons.

The surface of the slide member 5 is required to have excellent resistance to abrasion and a high sliding performance. In order to reduce friction between the slide member 5 and the protective coating 24 of the magneto-optical disk 23 and, in association therewith, in order to reduce abrasion of the slide member 5 and prolong the life thereof, adding a specific amount of lubricant to the slide member 5 is known. Japanese Patent Publication No. 63-58605 discloses that a lubricant such as, for example, a fatty acid, a higher alcohol, a fatty acid ester or the like can be used as a suitable lubricant.

The use of a liquid lubricant is preferred in making the most of this embodiment. It is known that the liquid lubricant exhibits an effective lubricating action by coating the surface of the slide member 5 to be lubricated with an extremely thin uniform film having very few molecular layers.

The lubricant 3 which has oozed out of the epoxy resin layer 4 is, however, lost little by little from the surface of the slide member 5 due to a transfer of the lubricant 3 to the protective coating 24 of the magneto-optical disk 23 resulting from repeated sliding movements, vaporization into the atmosphere, adhesion of dirt or dust, or some other reasons. Because of this, a long sliding operation gradually loses the effect of the lubricating action.

According to this embodiment, the specific surface of the silica particulates 1 is large of 100–1000 m²/g, and therefore, the amount of lubricant 3 which is held on surface portions of the silica particulates 1 considerably increases. If the amount of lubricant 3 existing on the surface of the slide member 5 is reduced, the lubricant 3 which adheres to the surface portions of the silica particulates 1 located inside the slide member 5 seeps out on the surface of the slide member 5 for lubrication between the slide member 5 and the protective coating 24 of the magneto-optical disk 23. If the supply of the lubricant 3 is not terminated, the sliding characteristic between the slide member 5 and the protective coating 24 is maintained in a desired state, thereby maintaining a low-friction state.

In order to render the durability to satisfy 1000 hours under the conditions shown in FIGS. 3 and 4, an amount of silica particulates 1 greater than 15% by weight is required in the case where the specific surface is 100 m²/g, or an amount of silica particulates 1 greater than 1% by weight is required in the case where the specific surface is 1000 m²/g.

The lubricant 3 reaches the surface of the slide member 5 through spaces existing in the slide member 5. Accordingly, the lubricant 3 is so chosen as to travel through such spaces at an appropriate speed.

In this embodiment, the speed of travel is controlled with the use of the lubricant 3 having a linear molecular structure. The control of the speed of travel is performed by specifying the length of linear molecules i.e., the molecular weight, and the index of length represented by the number of carbon atoms is used. When the lubricant 3 has a high molecular weight, the speed is reduced. In contrast, when the molecular weight is low, the speed is increased. In this embodiment, lubricants having 20 to 60 carbon molecules can be used, and preferably, those having 30 to 50 carbon molecules can be effectively used. Accordingly, the objects of the present invention can be accomplished if the number of carbon molecules of the lubricant 3 ranges from 30 to 50 and if the total surface area of the silica particulates 1 exceeds a specific value.

Furthermore, the speed of travel of the lubricant can be controlled by the use of a lubricant having a linear molecular structure in combination with that having a branched molecular structure. In applications where a lubricant component having a molecular structure branched in three directions is utilized as one of constituent elements of the lubricant 3, when the number of carbon atoms existing in one direction of three branches is 20, the total number of carbon atoms in other two directions is so chosen as to range from 10 to 15. By doing so, the upper limit of the temperature range in which the sliding performance of the slide member 5 can be maintained can be increased about 20° C. The simultaneous use of the lubricant having a linear molecular structure and that having a branched molecular structure can increase the upper limit of the temperature range in which the lubricating characteristic of the slide member 5 can be maintained.

As discussed hereinabove, according to the present invention, the slide member 5 has the epoxy resin layer 4 which contains the lubricant 3 having a linear molecular structure and in which the silica particulates 1 having a specific surface of 100–1000 m²/g, measured in accordance with the BET equation, are embedded at a ratio of from 1% to 15% by weight relative thereto. This slide member 5 is in contact with an open end of the magnetic circuit C, which comprises the yoke portion 13 and the main magnetic pole 14 both made of ferrite, and the winding 15 wound around the main magnetic pole 14. Accordingly, the lubricant 3 is always maintained on the surface of the slide member 5 and prevents the sliding state from becoming worse for a long time. As a result, the magnetic biasing apparatus M according to the present invention causes no time lag in recording timing and does not deteriorate the quality of recorded information.

It is to be noted that in this embodiment, although a liquid lubricant of a fatty acid ester is used as the lubricant 3, generally the same effects can be obtained with the use of any other suitable liquid lubricant having different chemical properties and a different density, such as, for example, a polydimethyl siloxane, a paraffin oil, a wax, a saturated or unsaturated fatty acid, a fatty acid amide, or a fatty acid chloride.

It is also to be noted that in this embodiment, although the epoxy resin 4 is used as a crosslinked setting resin, the speed of travel of the lubricant 3 can be effectively controlled during a high-temperature sliding operation with the use of a thermosetting resin such as, for example, a polyimide resin or a ultraviolet-curing resin such as, for example, an epoxy resin or an urethane resin.

Figure 5:
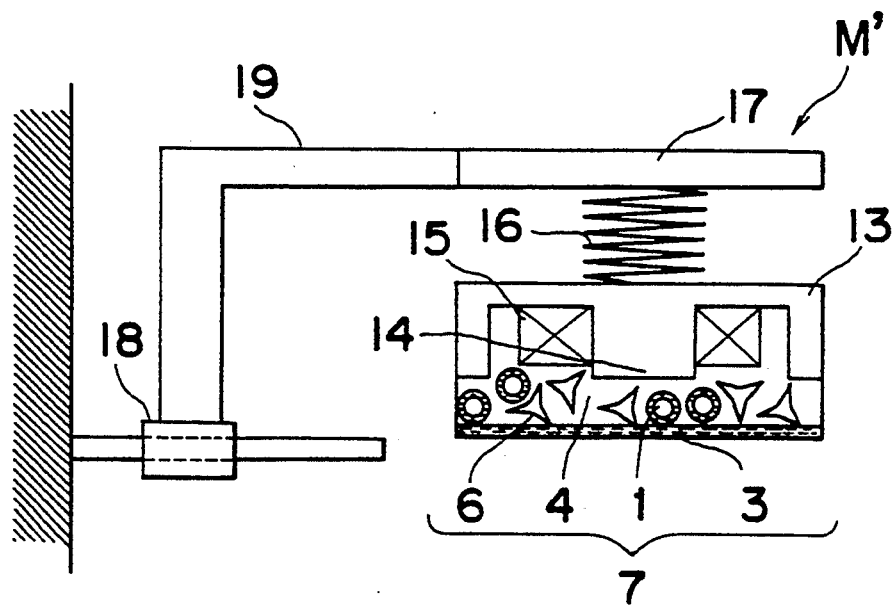
FIG. 5 is a view similar to FIG. 1, but according to a second embodiment of the present invention.

FIG. 5 schematically depicts a magnetic biasing apparatus M' according to a second embodiment of the present invention.

The magnetic biasing apparatus M' comprises a slide member 7, a magnetic circuit C having an open end to which the slide member 7 is bonded. The slide member 7 comprises an epoxy resin layer 4, a large number of silica particulates 1 and a large number of zinc oxide whiskers 6 both embedded in the epoxy resin layer 4, and a lubricant 3 contained or occluded in the epoxy resin layer 4. Each of the zinc oxide whiskers 6 is in the form of a tetrapod. The lubricant 3 is based on a fatty acid ester having a linear molecular structure and gradually oozes out of the epoxy resin layer 4 to form an extremely thin lubricant layer on the surface thereof, as shown in FIG. 5. The magnetic circuit C has the same construction as that shown in FIG. 1 and comprises a yoke portion 13 and a main magnetic pole 14 both made of ferrite and bonded to the slide member 7, and a winding 15 wound around the main magnetic pole 14. As is the case with the magnetic biasing apparatus M shown in FIG. 1, the yoke portion 13 is connected to one end of a spring 16, the other end of which is connected to a base 17. The base 17 is connected to a movable element 18 via a generally L-shaped pillar 19.

As is the case with the magnetic biasing apparatus M shown in FIG. 1, the magnetic biasing apparatus M' of the above-described construction is generally coupled with an optical head assembly H, as shown in FIG. 2.

In recording information on an magneto-optical disk 23, when the magneto-optical disk 23 is rotated by the spindle motor 25, a protective coating 24 overlying the magneto-optical disk 23 is brought into contact with the slide member 7 and slides relative thereto. When the speed of the magneto-optical disk 23 reaches a specific one and when that portion (recording spot) of the magneto-optical disk 23 on which recording is to be performed is placed between the slide member 7 and the optical head 21 by the operation of the movable element 18, a laser beam focused on the magneto-optical disk 23 is applied to a magneto-optical recording film formed on the magneto-optical disk 23 for the heating of the recording spot while the position of the objective lens 20 is being controlled by a tracking control means and a focusing control means. At the same time, the information is written to the magneto-optical recording film by allowing a modulated current corresponding to a recording signal to flow in the winding 15 of the magnetic biasing apparatus M'. In reading, no current is allowed to flow in the winding 15, and a laser beam having a power less than that of the laser beam used during recording is applied to the recording spot while the position of the objective lens 20 is being controlled by the tracking control means and the focusing control means. The so-called magneto-optic Kerr effect is utilized during reading.

Figure 6:
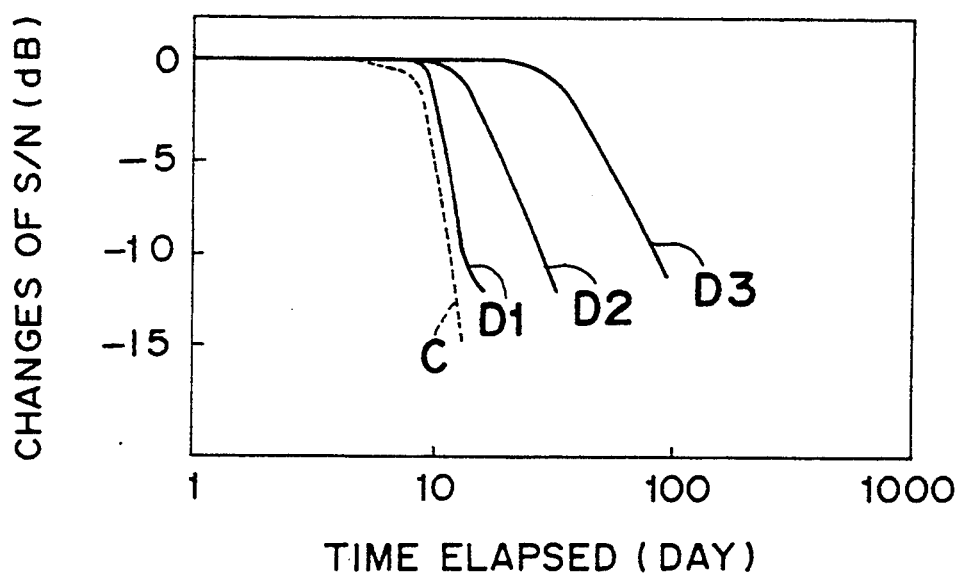
FIG. 6 is a graph similar to FIG. 4, but obtained by changing the mixing ratio of another filler relative to the slide member.

FIG. 6 is a graph indicating changes in S/N ratio with time at the time recording and reading have been repeated at a relative speed of 1.2 m/sec between the magnetic biasing apparatus M' and the magneto-optical disk 23 under an environment having a temperature of 60° C. and a relative humidity of 80%. In the graph of FIG. 6, curves shown by D1 through D3 represent changes in S/N ratio in applications where several magnetic biasing apparatus M' according to the present invention have been used, whereas a curve shown by C is plotted for comparison and represents a change in S/N ratio in applications where recording and reading have been repeated by the use of a conventional magnetic biasing apparatus.

The curves D1 through D3 have been drawn by changing the mixing ratio of the zinc oxide whiskers 6 with the slide member 7. Table 3 indicates the weight ratio of the zinc oxide whiskers 6 relative to the epoxy resin layer 4 in each magnetic biasing apparatus M'.

TABLE 3

|  | No. of Slide member | | |
| --- | --- | --- | --- |
|  | D1 | D2 | D3 |
| Weight Ratio (%) | 1 | 5 | 10 |

As is clear from the graph of FIG. 6, if the weight ratio of the zinc oxide whiskers 6 contained in the slide member 7 relative to the epoxy resin layer 4 exceeds 5% by weight, a deterioration in signal quality due to deterioration of the sliding characteristic, which has hitherto been caused in the conventional apparatus, has not been confirmed in the magnetic biasing apparatus M' according to the present invention.

It is considered that the sliding characteristic has been improved, as shown in FIG. 6, for the following reasons.

When the slide member 7 slides relative to the protective coating 24 of the magneto-optical disk 23, shearing stresses are always applied to the surface of the slide member 7 in a direction of slide thereof. Because of this, a phenomenon in which molecules move in the shearing direction occurs in a resin having a relatively weak bonding force between molecules thereof. Because this phenomenon depends upon a law of hydrodynamics, the closer to the surface of the slide member 7, the greater the extent of movement is. In the slide member 7 of the magnetic biasing apparatus M' according to the second embodiment of the present invention, the zinc oxide whiskers 6 in the form of a tetrapod exhibit an anchoring effect and functions as a resistance against the movement of the epoxy resin 4. In other words, the zinc oxide whiskers 6 exist across the slide member 7 and from a deep layer portion to a surface layer portion thereof, and because the zinc oxide whiskers 6 depend upon a movement of the deep layer portion of the slide member 7, the epoxy resin 4 is prevented from flowing.

In the conventional magnetic biasing apparatus, the slide member, having undergone a long sliding operation, is susceptible to the formation of projections on the surface of a trailing area thereof with respect to the direction of slide thereof, which projections result from a flow of resin, constituting the slide member, over a surface of the slide member at such trailing area. As a result, the distance between the main magnetic pole of the magnetic biasing apparatus and the recording film of the magneto-optical disk is increased, and the S/N ratio is deteriorated due to shortage of the magnetic field during recording.

On the other hand, in the magnetic biasing apparatus M' according to the present invention, because the flow of the epoxy resin 4 is restricted in the slide member 7, no projections are generated on the surface of the slide member 7, and therefore, no deterioration is caused in S/N ratio.

As discussed hereinabove, according to the second embodiment of the present invention, the slide member 7 has the epoxy resin layer 4 which contains the lubricant 3 and in which the zinc oxide whiskers 6 taking the form of a tetrapod are embedded. This slide member 7 is in contact with an open end of the magnetic circuit, which comprises the yoke portion 13 and the main magnetic pole 14 both made of ferrite, and the winding 15 wound around the main magnetic pole 14. Accordingly, the slide member 7 is free from the phenomenon in which the epoxy resin 4 flows and which may cause the generation of projections on the surface of the slide member 7. As a result, the magnetic biasing apparatus M' according to the present invention does not deteriorate the quality of recorded information without causing shortage of the recording magnetic field.

It is to be noted that in the second embodiment of the present invention, although the zinc oxide whiskers 6 taking the form of a tetrapod are used, generally the same effects can be obtained even by the use of acicular crystals exhibiting the anchoring effect. The reason for this is that an essential matter to obtain the effects of the present invention is the configuration of the material contained in the epoxy resin layer 4.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A magnetic biasing apparatus for generating a magnetic field required to record or erase information signals on or from a magneto-optic recording medium, said magnetic biasing apparatus comprising:
   a magnetic circuit capable of recording or erasing the information signals on or from the magneto-optical recording medium, said magnetic circuit comprising a magnetic member having a high permeability and a winding wound around said magnetic member, both of said magnetic member and said winding being disposed on an open end of said magnetic circuit; and
   a slide member bonded to the open end of said magnetic circuit and comprising a crosslinked setting resin, a first lubricant contained in said setting resin, and a filler embedded in said setting resin, said slide member sliding relative to said magneto-optical recording medium during recording or reading.

2. The magnetic biasing apparatus according to claim 1, wherein said filler comprises whiskers each in the form of a tetrapod.

3. The magnetic biasing apparatus according to claim 1, wherein said filler comprises acicular whiskers composed of fibers having a diameter of 0.1 to 1 $\mu$m and a length of 5 to 30 $\mu$m.

4. The magnetic biasing apparatus according to claim 1, wherein said first lubricant is selected from the group consisting of a fatty acid, a higher alcohol, and a fatty acid ester each having a linear molecular structure.

5. The magnetic biasing apparatus according to claim 4, wherein said filler comprises a porous material having a specific surface of from 100 to 1000 $m^2$/g, which was measured in accordance with BET (Brunauer-Emmett-Teller) adsorption isotherm equation.

6. A magnetic biasing apparatus for generating a magnetic field required to record or erase information signals on or from a magneto-optic recording medium, said magnetic biasing apparatus comprising:

a magnetic circuit capable of recording or erasing the information signals on or from the magneto-optical recording medium, said magnetic circuit comprising a magnetic member having a high permeability and a winding wound around said magnetic member, both of said magnetic member and said winding being disposed on an open end of said magnetic circuit; and a slide member bonded to the open end of said magnetic circuit and comprising a crosslinked setting resin, a first lubricant having a linear molecular structure, a second lubricant having a branched molecular structure, and a filler embedded in said setting resin, said slide member sliding relative to said magneto-optical recording medium during recording or reading.

* * * * *